(12) United States Patent
Ogawa et al.

(10) Patent No.: US 11,960,541 B2
(45) Date of Patent: Apr. 16, 2024

(54) NAME DATA MATCHING APPARATUS, AND NAME DATA MATCHING METHOD AND PROGRAM

(71) Applicant: NIPPON TELEGRAPH AND TELEPHONE CORPORATION, Tokyo (JP)

(72) Inventors: Manami Ogawa, Musashino (JP); Masataka Sato, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 39 days.

(21) Appl. No.: 17/782,783

(22) PCT Filed: Dec. 19, 2019

(86) PCT No.: PCT/JP2019/049897
§ 371 (c)(1),
(2) Date: Jun. 6, 2022

(87) PCT Pub. No.: WO2021/124525
PCT Pub. Date: Jun. 24, 2021

(65) Prior Publication Data
US 2023/0350948 A1    Nov. 2, 2023

(51) Int. Cl.
*G06F 16/00* (2019.01)
*G06F 16/215* (2019.01)
*G06F 16/901* (2019.01)

(52) U.S. Cl.
CPC ........ *G06F 16/9024* (2019.01); *G06F 16/215* (2019.01)

(58) Field of Classification Search
CPC .......................... G06F 16/9024; G06F 16/215
See application file for complete search history.

(56) References Cited

U.S. PATENT DOCUMENTS

2018/0203897 A1*   7/2018   Van Rest ............ G06F 16/9024
2020/0342055 A1*  10/2020   Patra ..................... G06N 3/048
(Continued)

FOREIGN PATENT DOCUMENTS

JP    H0869474 A     3/1996
JP    200511078 A    1/2005
(Continued)

*Primary Examiner* — Khanh B Pham
(74) *Attorney, Agent, or Firm* — Harness, Dickey & Pierce, P.L.C.

(57) ABSTRACT

A name data associating device according to one embodiment associates synonymous name data having different notation between a first database (DB) holding adjacency information and a second DB holding adjacency information and path identification information, and includes: a path information extraction unit that generates all paths having common data common between both DBs as a starting point and the name data in the second DB as vertices, and extracts path information of each path; a path creation unit that, based on the information held by the first DB, generates paths having the same conditions as the extracted path information of each path; and an associating unit that associates the name data between the first and second DBs by extracting, from the generated paths, a combination of paths having more vertices passed through and fewer overlapping parts, and associating the vertices of each extracted path with the vertices of each path generated by the path information extraction unit.

12 Claims, 18 Drawing Sheets

(56) References Cited

U.S. PATENT DOCUMENTS

2020/0372021 A1\* 11/2020 Bross ................. G06F 16/9024
2021/0142008 A1\* 5/2021 Patra ..................... G06F 40/237
2021/0190505 A1\* 6/2021 Karlsson ............... H04W 4/024

FOREIGN PATENT DOCUMENTS

JP          2006244105 A     9/2006
JP          2014232389 A    12/2014

\* cited by examiner

Fig. 3

| DATA ID | HIGHER-ORDER BUILDING | LOWER-ORDER BUILDING |
|---|---|---|
| 1 | SHINJUKU BUILDING | YOYOGI BUILDING |
| 2 | YOYOGI BUILDING | SENDAGAYA BUILDING |
| 3 | SHINJUKU BUILDING | KABUKICHO BUILDING |
| 4 | SENDAGAYA BUILDING | YOTSUYA BUILDING |
| 5 | YOTSUYA BUILDING | SHINJUKU BUILDING |
| ⋮ | ⋮ | ⋮ |

| CLOSED PATH ID | HIGHER-ORDER BUILDING | LOWER-ORDER BUILDING |
|---|---|---|
| 1 | SHINJUKU BUILDING | MINAMI-SHINJUKU BUILDING |
| 1 | GAIEN BUILDING | MINAMI-SHINJUKU BUILDING |
| 1 | YOTSUYA BUILDING | GAIEN BUILDING |
| 1 | SHINJUKU BUILDING | YOTSUYA BUILDING |
| ⋮ | ⋮ | ⋮ |

| DATA ID | HIGHER-ORDER BUILDING | LOWER-ORDER BUILDING |
|---|---|---|
| ⋮ | ⋮ | ⋮ |
| 5 | YOTSUYA BUILDING | SHINJUKU BUILDING |
| 6 | TOYOMA BUILDING | IWAKI IZUMI BUILDING |
| 7 | IWAKI BUILDING | IWAKI IZUMI BUILDING |
| 8 | IWAKI BUILDING | IWAKI OGAWA BUILDING |
| 9 | IWAKI OGAWA BUILDING | YAMADA KOMINATO BUILDING |
| 10 | YAMADA KOMINATO BUILDING | TAJIN BUILDING |
| 11 | TAJIN BUILDING | IWAKI OGAWA BUILDING |
| 12 | ONAHAMA BUILDING | IWAKI JOBAN BUILDING |
| 13 | ONAHAMA BUILDING | IWAKI BUILDING |
| 14 | IWAKI JOBAN BUILDING | OHBAYASHI BUILDING |
| 15 | IWAKI JOBAN BUILDING | YAMADA KOMINATO BUILDING |
| 16 | IWAKI JOBAN BUILDING | IWAKI BUILDING |
| 17 | IWAKI TAMAGAWA BUILDING | IWAKI IZUMI BUILDING |
| 18 | IWAKI IZUMI BUILDING | IWAKI JOBAN BUILDING |
| 19 | OHBAYASHI BUILDING | IWAKI TAMAGAWA BUILDING |
| 20 | IWAKI TAMAGAWA BUILDING | IWAKI JOBAN BUILDING |
| 21 | SHIJO BUILDING | GOJO BUILDING |
| 22 | GOJO BUILDING | KYOTO BUILDING |
| ⋮ | ⋮ | ⋮ |

| CLOSED PATH ID | HIGHER-ORDER BUILDING | LOWER-ORDER BUILDING |
|---|---|---|
| ⋮ | ⋮ | ⋮ |
| 1 | SHINJUKU BUILDING | YOTSUYA BUILDING |
| 2 | IWAKI BUILDING | IZUMI BUILDING |
| 2 | IZUMI BUILDING | TOYOMA BUILDING |
| 2 | IWAKI BUILDING | JOBAN BUILDING |
| 2 | IZUMI BUILDING | TAMAGAWA BUILDING |
| 2 | TAMAGAWA BUILDING | DAINI-YABUKI BUILDING |
| 2 | JOBAN BUILDING | DAINI-YABUKI BUILDING |
| 2 | ONAHAMA BUILDING | IWAKI BUILDING |
| 2 | OGAWA BUILDING | IWAKI BUILDING |
| 2 | OGAWA BUILDING | TAJIN BUILDING |
| 2 | JOBAN BUILDING | KOMINATO BUILDING |
| 2 | KOMINATO BUILDING | TAJIN BUILDING |
| 2 | ONAHAMA BUILDING | JOBAN BUILDING |
| 3 | KYOTO BUILDING | GOJO BUILDING |
| 3 | SHIJO BUILDING | GOJO BUILDING |
| ⋮ | ⋮ | ⋮ |

| | |
|---|---|
| IWAKI IZUMI BUILDING | IZUMI BUILDING |
| IWAKI TAMAGAWA BUILDING | TAMAGAWA BUILDING |
| OHBAYASHI BUILDING | DAINI-YABUKI BUILDING |
| IWAKI JOBAN BUILDING | JOBAN BUILDING |
| IWAKI OGAWA BUILDING | OGAWA BUILDING |
| TAJIN BUILDING | TAJIN BUILDING |
| YAMADA KOMINATO BUILDING | KOMINATO BUILDING |

1034

NAME DATA MATCHING APPARATUS, AND NAME DATA MATCHING METHOD AND PROGRAM

CROSS-REFERENCE TO RELATED APPLICATIONS

This application is a 371 U.S. National Phase of International Application No. PCT/JP2019/049897, filed on Dec. 19, 2019. The entire disclosure of the above application is incorporated herein by reference.

TECHNICAL FIELD

Embodiments of this invention relate to a name data associating device, a name data associating method, and a program.

BACKGROUND ART

Work performed using databases includes integrating DBs under different management and using stored name data side by side to perform more diversified and comprehensive analysis. To that end, it is necessary to perform a process called "name collating", which integrates the name data by assigning the same identification information to name data representing the same item among the databases to be integrated.

However, the method for inputting name data depends on the administrator of the database. As a result, there are often situations where notations for an item differ between databases to be integrated despite the item being the same between the databases (notation inconsistency). If databases containing a notation inconsistency are integrated, a situation may arise in which, when analysis is performed as described above, information related to a single item is missing only in the part having the notation inconsistency.

As a technique for handling such notation inconsistencies, PTL 1 and PTL 2 propose a method of searching for the most similar character strings by quantitatively calculating a degree of similarity between character strings to be searched for. In addition, PTL 3 proposes a method of associating character strings having a degree of similarity greater than or equal to a set threshold by calculating feature amounts from search character strings using TF-IDF (Term Frequency-Inverse Document Frequency). Furthermore, PTL 4 proposes a method of accurately and efficiently finding character strings that represent the same item by comparing character string-specific data, such as a measurement date/time and a measurement value corresponding to a search character string to determine a correspondence relationship between character strings, and then creating a search dictionary.

CITATION LIST

Patent Literature

[PTL 1] JP 2005-11078A

[PTL 2] JP 8-069474A

[PTL 3] JP 2006-244105A

[PTL 4] JP 2014-232389A

SUMMARY OF THE INVENTION

Technical Problem

There are two types of notation inconsistencies, namely notation which abbreviates a registered data name, and notation using a given name (a common name) based on local rules among users.

Methods such as those disclosed in PTL 1 and 2 are popular and effective when only the former, i.e., abbreviated notation, is present as a notation inconsistency. However, in a situation where the latter, i.e., common name notation, is mixed in, a name that is similar in terms of the character string to each common name is associated with each common name, making it highly likely that an erroneous result will be presented. This is because in many cases, the common name notation is significantly different from the name that originally should be associated with the common name.

Additionally, even when handling only the former, i.e., abbreviated notation, the methods disclosed in PTL 1 and 2 are created assuming use with the Japanese language, and thus the scope of application of the technique is limited. This is because not all features of abbreviated notations in Japanese and such features in other languages are the same, and the methods disclosed in PTL 1 and 2 may not be applicable to name data input in other languages without problems.

Likewise, methods using morphemes such as that disclosed in PTL 3 are not as effective for common names. This is because in addition to the aforementioned reasons, similarity calculation methods such as TF-IDF are based on the extremely general idea that "frequently-occurring words (morphemes) are of low (high) importance", while common names are given according to local rules, making morpheme-based searches extremely incompatible with common names.

It is therefore thought that the optimal method for common name notation is to create a dictionary as disclosed in PTL 4. However, for creating a dictionary, the method disclosed in PTL 4 assumes that the character string-specific data corresponding to the name data has a correspondence relationship between the databases to be integrated, and if there is no such correspondence relationship, the dictionary cannot be created. What is needed, therefore, is a technique that can associate even synonymous name data for which character string-specific data does not have a correspondence relationship between databases to be integrated.

This invention aims to provide a technique that can, with no human effort, accurately associate synonymous name data having notation inconsistencies between databases to be integrated, even if character string-specific data corresponding to the name data has no correspondence relationship between the databases.

Means for Solving the Problem

To solve the above-described problem, a name data associating device according to one aspect of this invention is a name data associating device that associates name data that is synonymous and has different notation between a first database and a second database, the first database holding a plurality of pieces of name data and adjacency information indicating adjacency relationships among the name data, and the second database holding a plurality of pieces of name data, adjacency information of the name data, and path identification information indicating paths to which the name data belong. The device includes: a common data extraction unit that extracts, as common data, name data having a same notation between the first database and the second database; a path information extraction unit that, based on information held by the second database, generates all of paths having one piece of the common data extracted by the common data extraction unit as a starting point and the name data held by the second database as vertices, and for each of the paths, extracts path information including a number of vertices, the common data that is included, and a location of the common data; a path creation unit that, on the basis of information held in the first database, generates all paths that match name data of the starting point, the number of vertices, the common data included, and the location included in the path information of each path extracted by the path information extraction unit; and an associating unit that associates the name data held by the first database with the name data held by the second database by extracting, from the paths generated by the path creation unit, a combination of paths having a higher number of vertices that are passed through and fewer overlapping parts, and associating the vertices of each extracted path with the vertices of each path generated by the path information extraction unit.

Effects of the Invention

According to one aspect of this invention, the name data in the first database can be associated with the name data in the second database by extracting path information for all of paths, generated from information in the second database that holds path identification information, that take one piece of common data common between the first database and the second database taken as a starting point and take the name data held in the second database as vertices, generating all paths having the same conditions as that path information from the information held by the first database, and selecting, from among the generated paths, a combination of paths having a higher number of vertices that are passed through and fewer overlapping parts, as an optimal path. Accordingly, a technique can be provided in which synonymous name data having notation inconsistencies between databases to be integrated can be associated accurately, with no human effort, even if character string-specific data corresponding to the name data does not have a correspondence relationship between the databases.

BRIEF DESCRIPTION OF DRAWINGS

FIG. 3 is a diagram illustrating an example of information held by a basic database stored in a basic database storage part.

FIG. 4 is a diagram illustrating an example of information held by a derivative database stored in a derivative database storage part.

FIG. 7 is a diagram illustrating an example of information held by the basic database in an operation example.

FIG. 8 is a diagram illustrating an example of information held by the derivative database in an operation example.

FIG. 13 is a diagram illustrating an example of output information stored in an output information storage part in an operation example.

DESCRIPTION OF EMBODIMENTS

Embodiments of this invention will be described hereinafter with reference to the drawings.

In the present embodiment, a plurality of databases hold synonymous name data having different notations, and data columns for which the name data is to be associated in the databases are assumed to be known. Each data column can contain name data and character string-specific data corresponding to the name data, e.g., a measurement value, a measurement date/time, a sale date/time, a sales amount, and so on. It is also assumed that each database holds logical or physical adjacency information indicating an adjacency relationship of the name data. Here, "adjacency information indicating an adjacency relationship of the name data" refers to information on how pieces of data are connected to each other, e.g., human connections (person A and person B are acquaintances) or network connection relationships (building A and building B are connected by cables). It is also assumed that there is a network connection relationship between the name data in each database. Specifically, each database has columns named "higher-order building" and "lower-order building", and the name data stored in "higher-order building" and the name data stored in "lower-order building" represent the fact that the items are adjacent on a given network. In addition, it is assumed that at least one of the plurality of databases has additionally been given path identification information representing a path to which the name data belongs, in addition to the adjacency information.

Configuration Example

Figure 1:
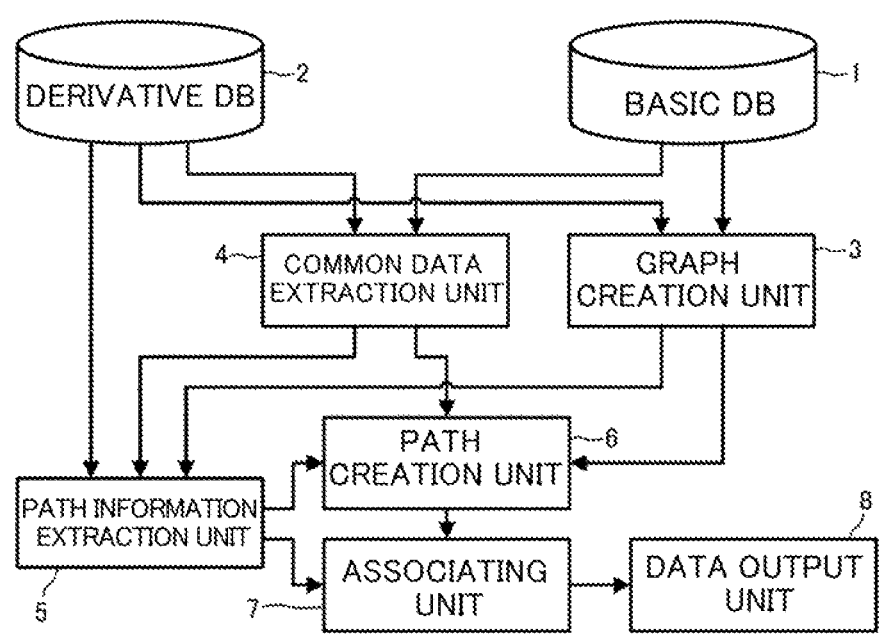
FIG. 1 is a block diagram illustrating an example of the configuration of a name data associating device according to an embodiment of this invention.

FIG. 1 is a block diagram illustrating an example of the configuration of a name data associating device according to an embodiment of this invention. Although the number of databases for which name data is associated is not particularly limited in this invention, the number of databases is assumed to be two in the present embodiment in order to simplify the descriptions.

The name data associating device includes a basic database ("database" is abbreviated to "DB" in the drawings) 1, a derivative database 2, a graph creation unit 3, a common data extraction unit 4, a path information extraction unit 5, a path creation unit 6, an associating unit 7, and a data output unit 8.

The basic database 1 is a first database holding a plurality of pieces of name data, and adjacency information indicating adjacency relationships among that name data. The derivative database 2 is a second database holding a plurality of pieces of name data, adjacency information of that name data, and path identification information indicating paths to which that name data belong.

The graph creation unit 3 creates an undirected graph having name data as vertices, on the basis of the information held by the basic database 1 and the derivative database 2.

The common data extraction unit 4 extracts, as common data, name data having the same notation between the basic database 1 and the derivative database 2.

The path information extraction unit 5 generates, on the basis of the information held by the derivative database 2, all paths having one instance of the common data extracted by the common data extraction unit 4 as a starting point and the name data held by the derivative database 2 as vertices, and extracts path information for each of those paths, the path information including a number of vertices, the common data included, and the locations thereof. For example, the path information extraction unit 5 can extract the path information on the basis of the undirected graph created by the graph creation unit 3 and the path identification information held by the derivative database 2.

The path creation unit 6 generates all paths that match the name data of the starting point, the number of vertices, the included common data, and the location included in the path information of each path extracted by the path information extraction unit 5, on the basis of the information held by the basic database 1. For example, the path creation unit 6 can generate the paths on the basis of the undirected graph created by the graph creation unit 3.

The associating unit 7 extracts, from each path generated by the path creation unit 6, a combination of paths having a higher number of vertices that are passed through and fewer overlapping parts, and by associating the vertices of each extracted path with the vertices of each path generated by the path information extraction unit 5, associates the name data held by the basic database 1 with the name data held by the derivative database 2.

The data output unit 8 generates output information on the basis of the result of the association by the associating unit 7, and outputs the output information. For example, on the basis of the result of the association by the associating unit 7, the data output unit 8 can generate a correspondence table expressing the correspondence relationships among the name data as the output information. The data output unit 8 may also convert the name data for the information held by the basic database 1 on the basis of the result of the association by the associating unit 7, create a new database, and use the new database as output information. Alternatively, the data output unit 8 may integrate the information held by the basic database 1 and the derivative database 2 on the basis of the result of the association by the associating unit 7, create a new database, and use the new database as output information.

To simplify the descriptions, the following will assume that a path is a closed path in which the starting point and ending point are the same vertex.

In this case, the graph creation unit 3 is a closed path graph creation unit that creates a closed path graph as the undirected graph. In other words, the graph creation unit 3 creates a closed path graph having name data as vertices, on the basis of the adjacency information held by the basic database 1 and the derivative database 2.

The path information extraction unit 5 is a closed path information extraction unit that generates a closed path as the path and generates closed path information as the path information. In other words, on the basis of closed path identification information, which is the closed path graph created by the graph creation unit 3 and the path identification information held by the derivative database 2, the path information extraction unit 5 generates all closed paths in which one instance of the common data is the starting point and the ending point and the name data held by the derivative database 2 is vertices, and for each of the generated closed paths, extracts closed path information including the number of vertices, the included common data, and the locations.

The path creation unit 6 is a closed path creation unit that generates a closed path as the path. In other words, on the basis of the closed path graph created by the graph creation unit 3, the path creation unit 6 generates all closed paths that match the name data of the starting points and the ending points, the number of vertices, the included common data, and the locations included in the closed path information of each path extracted by the path information extraction unit 5.

The associating unit 7 extracts, from each closed path generated by the path creation unit 6, a combination of closed paths having a higher number of vertices that are passed through and fewer overlapping parts, and by associating the vertices of each of the extracted closed paths with the vertices of each of the closed paths generated by the path information extraction unit 5, associates the name data held by the basic database 1 with the name data held by the derivative database 2.

Figure 2:
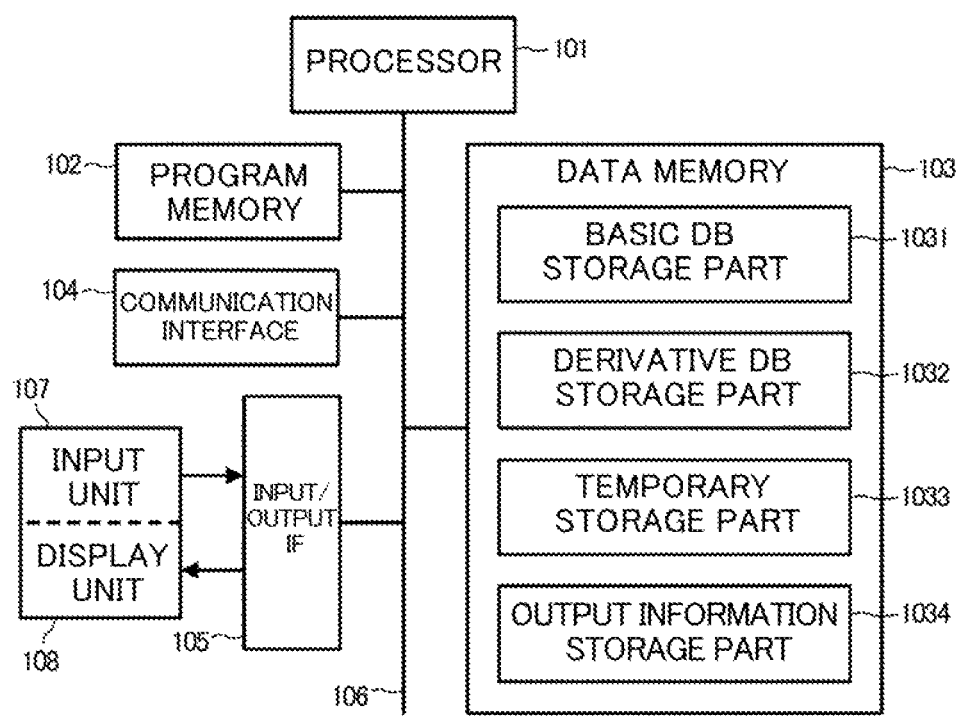
FIG. 2 is a diagram illustrating an example of the hardware configuration of the name data associating device.

FIG. 2 is a diagram illustrating an example of the hardware configuration of the name data associating device.

As illustrated in FIG. 2, the name data associating device is constituted by a computer such as a server computer, a personal computer, or the like, for example, and includes a hardware processor 101 such as a CPU (Central Processing Unit). In the name data associating device, program memory 102, data memory 103, a communication interface 104, and an input/output interface (denoted as "input/output IF" in FIG. 2) 105 are connected to the processor 101 via a bus 106.

The communication interface 104 can include, for example, one or more wired or wireless communication modules. When the basic database 1 and/or the derivative database 2 are configured in a data server or the like connected to a network such as a LAN (Local Area Network) or the Internet, the communication interface 104 can communicate with that data server or the like and obtain data from the data server or the like. The communication interface 104 can also communicate with an external data processing device or the like, receive requests from that data processing device, return data processing results in response to those requests to the data processing device, and so on.

An input unit 107 and a display unit 108 are connected to the input/output interface 105. The input unit 107 and the display unit 108 can be used, for example, with what is known as a tablet-type input/display device, in which an input detection sheet employing an electrostatic system or pressure-based system is disposed on the display screen of a display device that uses liquid crystals or organic EL (Electro Luminescence). Note that the input unit 107 and the display unit 108 may be configured as independent devices. The input/output interface 105 inputs, to the processor 101, operation information input through the stated input unit 107, and causes the display unit 108 to display display information generated by the processor 101.

Note that the input unit 107 and the display unit 108 need not be connected to the input/output interface 105. By including a communication unit for connecting to the communication interface 104 directly or over a network, the input unit 107 and the display unit 108 can exchange information with the processor 101.

Additionally, the input/output interface 105 may have a read/write function for recording media including semiconductor memory such as Flash memory, or a function for connecting to a reader/writer that has a read/write function for such recording media. This makes it possible to use a recording medium which can be attached to and removed from the name data associating device to be used for the databases that hold the name data. The input/output interface 105 may further have a function for connecting to another device.

The program memory 102 uses, for example, a combination of non-volatile memory that can be written to and read from at any time, such as an HDD (Hard Disk Drive) or an SSD (Solid State Drive), and non-volatile memory such as ROM, as a non-transitory tangible computer-readable storage medium. Programs necessary for the processor 101 to execute various types of control processing according to the embodiment are stored in the program memory 102. In other words, processing function parts in the above-described graph creation unit 3, common data extraction unit 4, path information extraction unit 5, path creation unit 6, associating unit 7, and data output unit 8 can all be implemented by the stated processor 101 reading out and executing programs stored in the program memory 102. Some or all of these processing function parts may be implemented by other various forms of integrated circuits, including application-specific integrated circuits (ASICs) or field-programmable gate arrays (FPGAs).

The data memory 103 uses, for example, a combination of the above-described non-volatile memory and volatile memory such as RAM (Random Access Memory) as a tangible computer-readable storage medium. This data memory 103 is used to store various types of data obtained and created as various types of processing are performed. In other words, regions for storing various types of data are secured as appropriate in the data memory 103 as the various types of processing are performed. For example, a basic database storage part 1031, a derivative database storage part 1032, a temporary storage part 1033, and an output information storage part 1034 can be provided in the data memory 103 as such regions.

The basic database storage part 1031 stores the information of the basic database 1, and the derivative database storage part 1032 stores the information of the derivative database 2. In other words, the basic database 1 and the derivative database 2 can be configured in the basic database storage part 1031 and the derivative database storage part 1032.

FIG. 3 is a diagram illustrating an example of the information held by the basic database 1 stored in the basic database storage part 1031, and FIG. 4 is a diagram illustrating an example of the information held by the derivative database 2 stored in the derivative database storage part 1032. An example in which the name data is names of buildings is given here. In the basic database 1 stored in the basic database storage part 1031, "higher-order building" and "lower-order building" are in an adjacency relationship. In the derivative database 2 stored in the derivative database storage part 1032, a combination of buildings having the same closed path identifier ("identifier" is abbreviated as "ID" in the drawings) constitute a single closed path (Shinjuku Building→Minami-Shinjuku Building→Gaien Building→Yotsuya Building→Shinjuku Building). In the following, building names in the derivative database 2 will be represented by $c_i$ ($i \in \{1, 2, \ldots, n\}$), and building names in the basic database 1 will be represented by $d_j$ ($j \in \{1, 2, \ldots, m\}$). Here, n and m represent a number of building names in each database.

The information stored in the basic database storage part 1031 and the derivative database storage part 1032 can be, for example, information of the basic database 1 and the derivative database 2 received by the processor 101 via the input/output interface 105 and input from the input unit 107. In other words, the basic database 1 and the derivative database 2 can be constructed in the data memory 103. Note that all or some of the information held by the basic database 1 and the derivative database 2 constructed in an external data server may be stored in the basic database storage part 1031 and the derivative database storage part 1032. In this case, for example, the processor 101 obtains the information accumulated in a database server via the communication interface 104 and stores the information in the storage parts 1031 and 1032 in response to an instruction made as a user operation from the input unit 107. Alternatively, the processor 101 may obtain information recorded in a recording medium via the input/output interface 105. Furthermore, the processor 101 may receive the information of the basic database 1 and the derivative database 2, and a name data association request, from an external data processing device or the like via the communication interface 104, and store the received database information in the storage parts 1031 and 1032 as information to be processed.

The temporary storage part 1033 stores the undirected graph created when the processor 101 operates as the above-described graph creation unit 3; the common data extracted when the processor 101 operates as the above-described common data extraction unit 4; all the closed paths created, and the closed path information extracted for each of those closed paths, when the processor 101 operates as the above-described path information extraction unit 5; the closed path generated when the processor 101 operates as the above-described path creation unit 6; the name data association result obtained when the processor 101 operates as the above-described associating unit 7; and the like.

The output information storage part 1034 stores the output information obtained when the processor 101 operates as the above-described data output unit 8.

Operations

Operations of the name data associating device will be described next.

Figure 5:
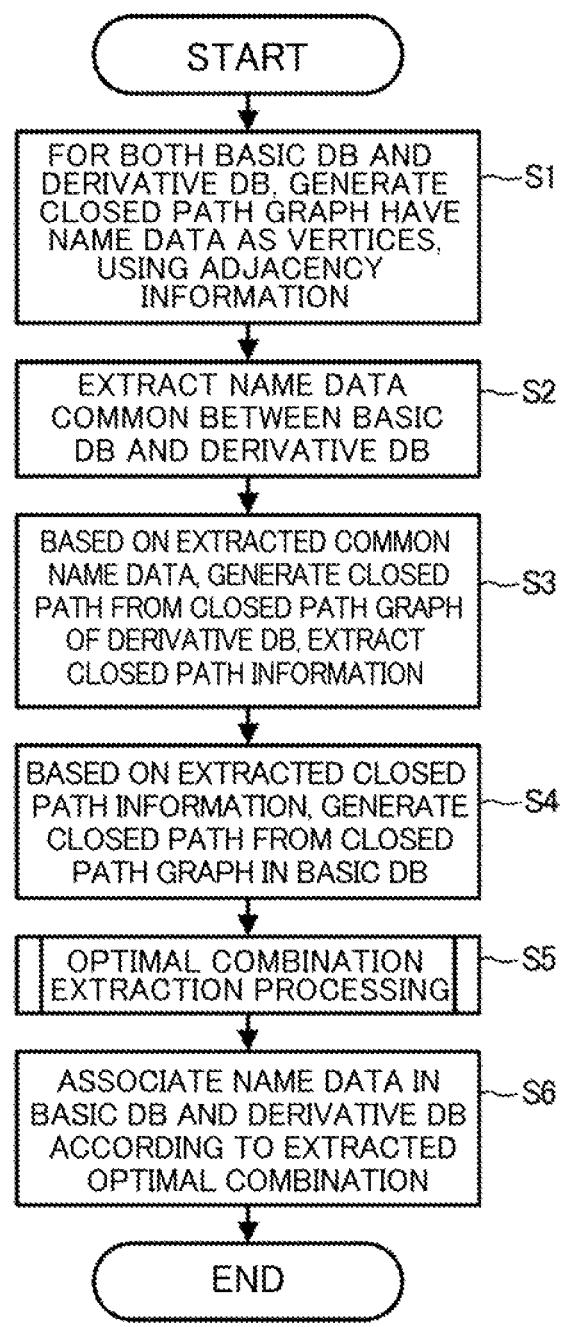
FIG. 5 is a flowchart illustrating an example of processing operations involved in name data association performed in the name data associating device.

FIG. 5 is a flowchart illustrating an example of processing operations involved in name data association performed in the name data associating device. It is assumed here that the information of the basic database 1 is already stored in the basic database storage part 1031, and that the information of the derivative database 2 is already stored in the derivative database storage part 1032. When an instruction to associate the name data is made from the input unit 107 via the input/output interface 105, or from an external data processing device via the communication interface 104, the processor 101 of the name data associating device starts the operations illustrated in this flowchart.

First, the processor 101 operates as the graph creation unit 3. In other words, using the adjacency information, the processor 101 generates closed path graphs $G_c$ and $G_d$, which take the name data as vertices, for the information of the basic database 1 stored in the basic database storage part 1031 and the information of the derivative database 2 stored in the derivative database storage part 1032 (step S1). The generated closed path graphs $G_c$ and $G_d$ are stored in the temporary storage part 1033 of the data memory 103.

When $c_i$ and $d_i$ are taken as vertices, and vertices in an adjacency relationship are interpreted as being connected by edges, the closed path graphs $G_c$ and $G_d$, which are undirected graphs, can be constructed as follows. Here, "closed path" is a partial graph of the closed path graph $G_c$, and refers to a path in which the starting point and the ending point are the same vertex.

$$V_c := \{c_i\}_{i=1}^n \text{ vertex set} \qquad [\text{Math. 1}]$$

$E_c$: a set of edges obtained from the adjacency information of the derivative database 2

$g_c$: $E_c \to P(V_c)$ (a map associating a subset of $V_c$ to a source of $E_c$) where $P(V_c)$ is a power set of $V_c$ $G_c := (g_c, V_c, E_c)$ $$V_d := \{d_j\}_{j=1}^m \text{ vertex set} \qquad [\text{Math. 2}]$$

$E_d$: a set of edges obtained from the adjacency information of the basic database 1

$g_d$: $E_d \to P(V_d)$ (a map associating a subset of $V_d$ to a source of $E_d$), where $P(V_d)$ is a power set of $V_d$ $G_d := (g_d, V_d, E_d)$ Additionally, the processor 101 of the name data associating device operates as the common data extraction unit 4. In other words, the processor 101 extracts name data that is common between the information of the basic database 1 stored in the basic database storage part 1031 and the information of the derivative database 2 stored in the derivative database storage part 1032 (step S2). The extracted common name data is stored in the temporary storage part 1033 of the data memory 103.

Next, the processor 101 operates as the path information extraction unit 5. In other words, on the basis of the common name data, the processor 101 generates a closed path $\Gamma_k$ ($k \in \{1, 2, \ldots, K\}$, where K is the total number of closed paths within the closed path graph $G_d$ from the closed path graph $G_c$ of the derivative database 2, and extracts the closed path information for each generated closed path $\Gamma_k$ (step S3). The generated closed path $\Gamma_k$ and the extracted closed path information are stored in the temporary storage part 1033 of the data memory 103.

Here, the closed path $\Gamma_k$ is a closed path that takes a vertex $s_k \in V_c$ in the closed path graph $G_c$ as a starting point.

$\Gamma_k[l]$: an lth vertex of the vertices constituting $\Gamma_k$ (an lth element)

$|\Gamma_k|$: length of a vector $\Gamma_k$ (the number of vertices constituting $\Gamma_k$)

$\Gamma_k = (s_k, \ldots, s_k)|$ $(\Gamma_k[l], \Gamma_k[l+1]) \in E_c$, $l \in \{1, 2, \ldots, |\Gamma_k|\}$ Although there may be any number of closed paths for the closed path graph $G_c$, all closed paths are assumed to satisfy the following three conditions.

1. $d_j \in V_d$ satisfying $s_k = d_j$ is present for all $s_k$
2. All edges constituting the closed path are present in $E_c$
3. $\forall c_i \in V_c$ belongs to one of the closed paths Here, a set of building names, extracted in step S2 and in which the notation is the same between $V_c$ and $V_d$, is assumed to be $S := \{c_i \in V_c | \exists d_j \in V_d \text{ s.t. } c_i = d_j\}$. For each $c_i$ and $d_j$ that is not an element of the set S, the name data associating device performs association using the closed path graphs $G_c$ and $G_d$ in the following manner. Here, I represents an index set of the vertices included in the set S, among the vertices in each $\Gamma_k$, and is defined as follows.

$I := \{x | \Gamma_k[x] \in S\}$

Next, the processor 101 operates as the path creation unit 6. In other words, on the basis of the extracted closed path information, the processor 101 creates a closed path A so that the starting point in the closed path graph $G_c$ of the basic database 1 is $s_k$ (step S4). The created closed path A is stored in the temporary storage part 1033 of the data memory 103. Note that it is necessary for the created closed path to satisfy the following conditions.

Condition 1: $|A| = |\Gamma_k|$
Condition 2: $A[x] = \Gamma_k[x] x \in I$
Condition 3: In principle, once a vertex or edge has been passed through, it will not be passed through again The processor 101 enumerates all of the closed paths A satisfying the foregoing conditions. As an exception to the above condition 3, if there is a vertex with degree 1 (a vertex with one edge to be joined), then a closed path that passes through the connecting edge twice is allowed.

Next, the processor 101 operates as the associating unit 7. In other words, the processor 101 performs optimal combination extraction processing, which extracts a combination having a higher number of vertices that are passed through and fewer overlapping parts as an optimal combination from the closed path A created in the above step S4 and having a starting point $s_k$ in the closed path graph $G_d$ of the basic database 1 (step S5).

Figure 6:
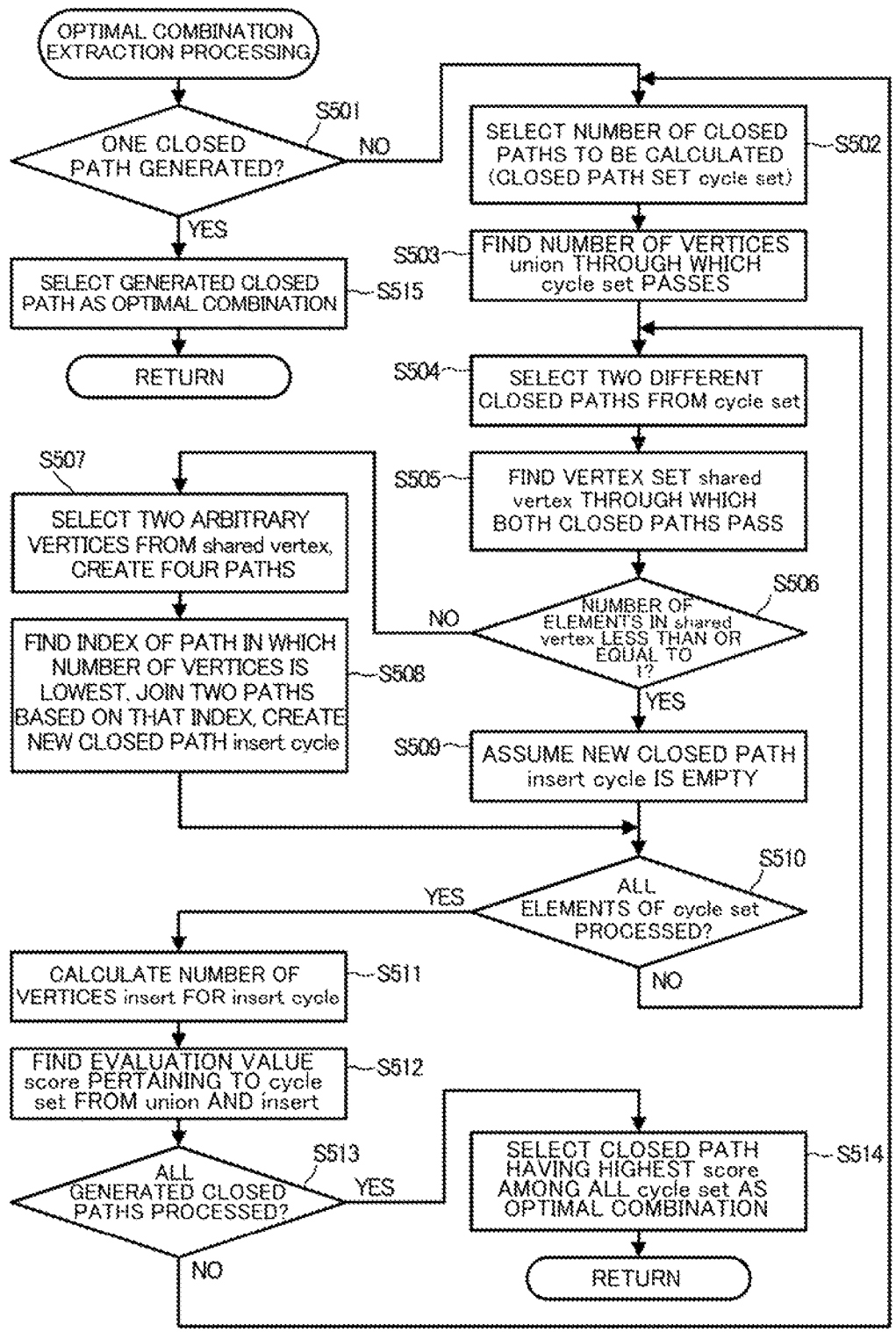
FIG. 6 is a flowchart illustrating an example of the details of optimal combination extraction processing in FIG. 5.

FIG. 6 is a flowchart illustrating an example of the details of the optimal combination extraction processing performed in the above step S5.

In the optimal combination extraction processing, the processor 101 first determines whether or not there is one closed path A having the starting point $s_k$ in the generated closed path graph $G_d$ (step S501). If it is determined that there are a plurality of the generated closed paths A (NO in step S501), the processor 101 calculates the overlapping parts as follows.

First, the processor 101 selects the number of closed paths that are to be calculated (step S502). In other words, the processor 101 arbitrarily selects closed paths from among the closed paths A generated in the above step S4, of a number equivalent to the number of closed paths having the starting point $s_k$. For example, if there are two closed paths that have the starting point $s_k$, two different closed paths are selected. The processor 101 stores a set of the selected closed paths in the temporary storage part 1033 of the data memory 103 as a cycle set.

A number of vertices union through which the set cycle set passes is defined as follows. The processor 101 finds this number of vertices union and stores that number in the temporary storage part 1033 of the data memory 103 (step S503).

union $:= |\{\cup_i A_i | A_i \in A | e \text{ cycle set}\}|$

Here, $\cup_i A_i$ represents the union for i of the set of vertices $d_l$ constituting a closed path $A_i$.

$$A_i := \{d_l | d_l \in A_i, A_i \in \text{cycle set}\}$$

$$\cup_i A_i := \cup_i \{d_l | d_l \in A_i, A_i \in \text{cycle set}\}$$

Next, a number of vertices insert that overlap between cycle sets is defined.

First, the processor 101 selects two different closed paths $\alpha_i$ and $\alpha_j$ from the set cycle set as initial values (step S504).

$$\alpha_i, \alpha_j \in \text{cycle set}$$

Next, the processor 101 finds, as shared vertex, a set of vertices through which both the closed paths $\alpha_i$ and $\alpha_j$ pass, and stores the shared vertex in the temporary storage part 1033 of the data memory 103 (step S505).

shared vertex: $\alpha_i \cap \alpha_j$ $$\alpha_i \cap \alpha_j := \{d_l | d_l \in \alpha_i, d_l \in \alpha_j\}$$

Next, the processor 101 determines whether the number of elements in the vertex set shared vertex is less than or equal to 1 (step S506).

If it is determined that the number of elements in the vertex set shared vertex is not less than or equal to 1 (NO in step S506), the processor 101 selects two arbitrary vertices, i.e., a_point and z_point, from the vertex set shared vertex. At this time, there are two paths connecting the two vertices a_point and z_point in each of the closed paths $\alpha_i$ and $\alpha_j$, and thus the processor 101 creates four paths p as described below (step S506). The processor 101 stores the four paths p created with the selected two vertices a_point and z_point in the temporary storage part 1033 of the data memory 103.

$$\exists x_{ai}, x_{zi} \text{ s.t. } \alpha_i[x_{ai}] = a\_point, \alpha_i[x_{zi}] = z\_point$$

$$\exists x_{aj}, x_{zj} \text{ s.t. } \alpha_j[x_{aj}] = a\_point, \alpha_j[x_{zj}] = z\_point$$

$$p_{i1} := \alpha_i[x_{ai} : x_{zi}] \quad p_{i2} := \alpha_i[x_{zi} : x_{ai}] \quad p_{j1} := \alpha_j[x_{aj} : x_{zi}]$$

$$p_{j2} := \alpha_j[xx_{zj} : x_{ai}]$$

Note that $\alpha_l[x:y]$ is as follows. Here, $l \in \{i,j\}$.

[Math. 3]

$$a_l[x:y] = \begin{cases} \text{array from xth element to yth element of } \alpha_l \ (y \geq x) \\ \text{array joining array from xth element to last element with} \\ \text{array from second element to yth element of } \alpha_l \ (x > y) \end{cases}$$

Note that when x>y, the arrays from the second element are combined because the first and last elements are duplicated in each $\alpha_l$.

Next, for the four paths p created in the above step S507, the processor 101 finds indices insert_x and insert_y of a path p in which the number of vertices is the lowest, among the combinations passing through all the vertices included in the vertex set shared vertex, and on the basis thereof, combines two paths to create a new closed path insert cycle$_{ij}$ (step S508) The processor 101 stores the new closed path insert cycle$_{ij}$ that has been created ion the temporary storage part 1033 of the data memory 103.

insert_x, insert_y = $\text{argmin}_{x,y}\{|p_x \cup p_y|\|\text{shared vertex-} \subseteq p_x \cap p_y \cap s_k\}$, $x, y \in \{i1, i2, j1, j2\}$ insert cycle$_{ij}$ := $p_{insert\_x} + p_{insert\_y}$ $p_{insert\_x} + p_{insert\_y}$: array of $p_{insert\_x}$ and $p_{insert\_y}$ joined by the second and subsequent elements Additionally, if it is determined in the above step S506 that the number of elements of the vertex set shared vertex is less than or equal to 1 (YES in step S506), the processor 101 generates a new closed path insert cycle$_{ij}$ that is empty, and stores that closed path in the temporary storage part 1033 of the data memory 103 (step S509).

In this manner, if the new closed path insert cycle$_{ij}$ has been generated in the above step S508 or the above step S509, the processor 101 determines whether all elements in the closed path set cycle set selected in the above step S502 have been processed (step S510).

If it is determined that all of the elements have not yet been processed (NO in step S510), the processor 101 returns to the process of the above step S504, selects two new closed paths aside from $\alpha_i$ and $\alpha_j$ in the elements of the set cycle set, and then repeats the processing from the above step S505 to the above step S509. However, if only one unselected element remains, in the above step S504, the processor 101 selects the closed path insert cycle$_{ij}$ generated in step S508 or step S509 and the unselected closed path, and then repeats the processing from the above step S505 to the above step S509.

Once all the elements of the closed path set cycle set have been processed in this manner, it is determined that all the elements of the set cycle set have been selected and processed in the above step S510. In this case (YES in step S510), the processor 101 calculates the number of vertices insert for the obtained closed path insert cycle$_{ij}$ according to the following definition, and stores the result in the temporary storage part 1033 of the data memory 103 (step S511).

When insert cycle$_{ij}$ is 1, then insert := |Iinsert cycle$_{ij}$|

When insert cycle$_{ij}$ is plural, then insert := |$\cup_{ij}$insert cycle$_{ij}$|

Here, $\cup_{ij}$insert cycle$_{ij}$ is a union for ij of the vertex sets constituting the closed path insert cycle$_{ij}$.

Then, from the number of vertices union through which the set cycle set passes and closed path insert cycle$_{ij}$, the processor 101 obtains an evaluation value score pertaining to the set cycle set of the closed path, as follows:

score := union-insert

The obtained evaluation value score is stored in the temporary storage part 1033 of the data memory 103.

Then, the processor 101 determines whether all the closed paths A generated in the above step S4 have been processed (step S513). If it is determined that all of the generated closed paths A have not yet been processed (NO in step S513), the processor 101 returns to the process of the above step S502, selects a number of unprocessed closed paths corresponding to the number to be calculated, and repeats the processing from the above step S503 to the above step S512.

Then, when all of the generated closed paths A have been processed, in step S513, the processor 101 determines whether all of the closed paths A have been processed (YES in step S513). In this case, the processor 101 refers to all the evaluation values score stored in the temporary storage part 1033 of the data memory 103, and selects, as the optimal closed path combination, a cycle set indicating the highest evaluation value score among the sets cycle set for all the closed paths (step S514). The optimal closed path combination to be selected is a single closed path if there is one cycle set that indicates the highest evaluation value score, or a combination of a plurality of closed paths if there are a plurality of cycle sets that indicate the highest evaluation value score. The processor 101 stores the selected optimal closed path combination as the extracted optimal combination in the temporary storage part 1033 of the data memory 103. The processor 101 then ends the optimal combination extraction processing.

On the other hand, if it is determined in the above step S501 that there is one closed path A that has been generated (YES in step S501), the processor 101 selects that generated closed path A as the optimal closed path combination (step S515). The processor 101 then ends the optimal combination extraction processing.

In this manner, if the optimal combination extraction processing has ended, the processor 101 associates the name data in the basic database 1 with the name data in the derivative database 2 in accordance with the optimal combination extracted through the optimal combination extraction processing, and stores a result in the temporary storage part 1033 of the data memory 103 (step S6). In other words, the processor 101 can associate the name data by comparing the closed path (or combination of closed paths) extracted through the optimal combination extraction processing with the closed path $\Gamma_k$ generated from the closed path graph $G_c$ in the derivative database 2 in the above step S3. If there are a plurality of closed paths (or combinations of closed paths) obtained through the optimal combination extraction processing, the processor 101 uses all of these as closed path candidates. In particular, it should be noted that for a closed path in which all vertices except the starting point are different, two candidates will appear even if there is only one candidate for the closed path. For example, if a closed path candidate of "Shinjuku Building", "Jingu-Mae Building", "Takeshita Building", and "Shinjuku Building" is obtained through the optimal combination extraction processing for a starting point of "Shinjuku Building" and a closed path $\Gamma_{sinjyuku}$ constituted by "Shinjuku Building", "Yoyogi Building", "Harajuku Building", and "Shinjuku Building", conceivable name data associations are ("Yoyogi Building", "Jingu-Mae Building") and ("Yoyogi Building", "Takeshita Building") for "Yoyogi Building", and ("Harajuku Building", "Jingu-Mae Building") and ("Harajuku Building", "Takeshita Building") for "Harajuku Building".

However, it is conceivable that vertices aside from the starting point are included in the index set I, and a closed path in which a combination of names is uniquely determined for some of the vertices is present. In such cases, a combination of uniquely-determined names is used. In the current example, if I={Shinjuku Building, Yoyogi Building} for the closed path $\Gamma_{sinjyuku}$ and a closed path candidate of "Shinjuku Building", "Yoyogi Building", "Takeshita Building", and "Shinjuku Building" has been obtained, only the combination ("Harajuku Building", "Takeshita Building") is obtained. (See the operation example below for details.)

$$\{(c_i,d_j)|d_j=A[x], c_i=\Gamma[x], x\notin 1\} \quad \text{[Math. 4]}$$

If the name data association has been completed as described above, the processor 101 generates output information in a form instructed from the input unit 107 or an exterior data processing device from the association result stored in the temporary storage part 1033 of the data memory 103 by operating as the data output unit 8. The processor 101 stores the generated output information in the output information storage part 1034 of the data memory 103. The processor 101 can then display output information in the display unit 108 via the input/output interface 105, sent the output information to an external data processing device via the communication interface 104, or the like.

With the name data associating device according to an embodiment as described thus far, a closed path graph that takes name data as vertices can be drawn using each instance of adjacency information in two target databases, and thus the name data is associated by creating closed paths, which have the same conditions (same number of vertices, starting point, and ending point) as the closed path information obtained from the closed path graph of the derivative database 2, on the closed path graph of the basic database 1 to which no closed path identification information has been assigned, and selecting the optimal closed path among the created closed paths. This makes it possible to, with no human effort, accurately associate synonymous name data having notation inconsistencies between databases to be integrated, even if character string-specific data corresponding to the name data has no correspondence relationship between the databases. Therefore, this can be expected to increase operational efficiency by reducing human effort.

Additionally, with the name data associating device according to the embodiment, if only one closed path matching the extracted closed path information can be generated from the information in the basic database 1, that closed path is immediately used as the optimal closed path combination, which speeds up the processing.

On the other hand, if a plurality of closed paths matching the extracted closed path information have been generated from the information in the basic database 1, the name data associating device according to the embodiment selects, from among the plurality of closed paths, a combination of the closed paths for each number of closed paths generated from the information of the derivative database 2 when extracting the closed path information, and by determining the number of vertices passed through and the overlapping parts for each closed path combination, selects the closed path combination having a higher number of vertices that are passed through and fewer overlapping parts. This makes it possible to extract the optimal closed path combination.

Additionally, the name data associating device according to the embodiment generates the output information, including the correspondence table of the name data on the basis of a result of associating the name data. Database integration processing can therefore be performed using the output information. Additionally, the name data associating device according to the embodiment may generate information of integrated databases as the output information.

Operation Example

An overview of applied name data and results will be described as an operation example of the present embodiment.

FIG. 7 is a diagram illustrating an example of the information held by the basic database 1 stored in the basic database storage part 1031 in the operation example, and FIG. 8 is a diagram illustrating an example of information held by the derivative database 2 stored in the derivative database storage part 1032 in the operation example. In this example, for name data having a closed path ID=2, vertex sets $V_c$ and $V_d$ are as follows.

$V_c$={Iwaki Building, Toyoma Building, Tamagawa Building, Daini-Yabuki Building, Joban Building, Onahama Building, Tajin Building, Kominato Building, Izumi Building, Ogawa Building}

$V_d$={Iwaki Building, Toyoma Building, Iwaki Tamagawa Building, Ohbayashi Building, Iwaki Joban Building, Onahama Building, Tajin Building, Yamada Kominato Building, Iwaki Izumi Building, Iwaki Ogawa Building}

In this example, the accurate notation combinations of the name data, i.e., the name data associations, are as follows, and it has been confirmed that the name data associating device according to the embodiment can perform this association correctly.

{(Iwaki Building, Iwaki Building), (Toyoma Building, Toyoma Building), (Onahama Building, Onahama Building), (Izumi Building, Iwaki Izumi Building), (Tamagawa Building, Iwaki Tamagawa Building), (Joban Building, Iwaki Joban Building), (Daini-Yabuki Building, Ohbayashi Building), (Tajin Building, Tajin Building), (Kominato Building, Yamada Kominato Building), (Ogawa Building, Iwaki Ogawa Building)}

Figure 9:
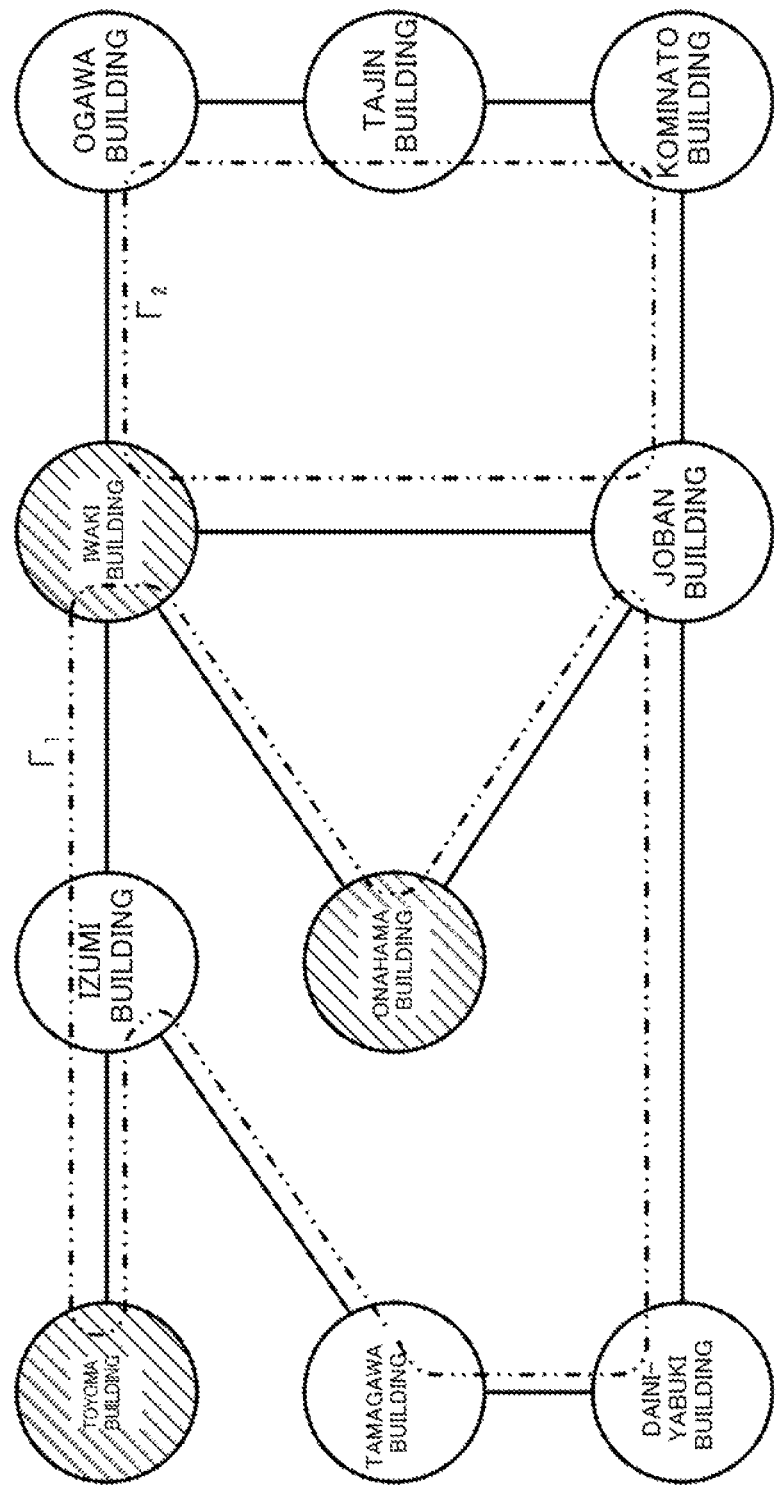
FIG. 9 is a schematic diagram illustrating an example of a closed path graph created, by a graph creation unit, from information held by the derivative database, in an operation example.
Figure 10:
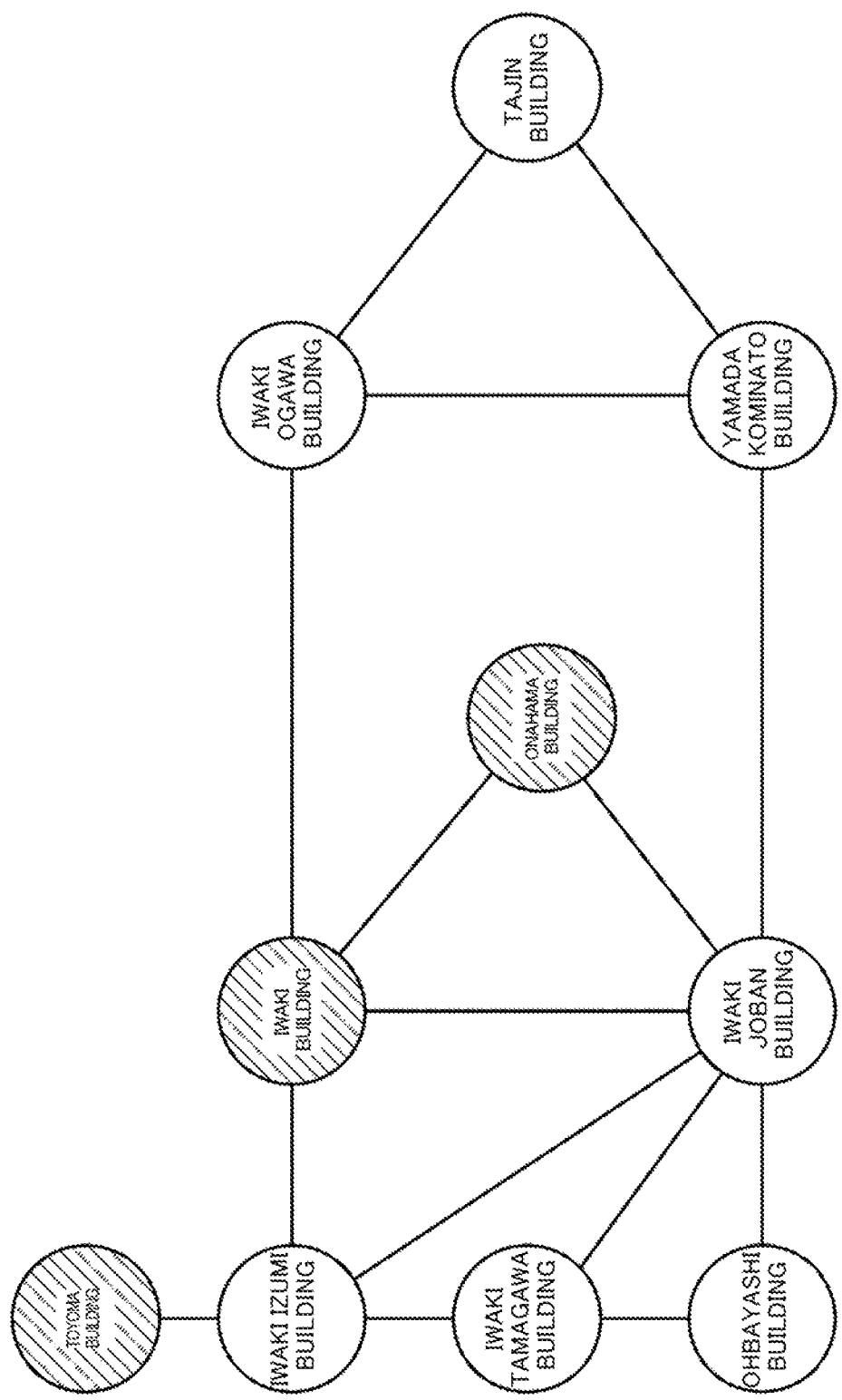
FIG. 10 is a schematic diagram illustrating an example of a closed path graph created, by a graph creation unit, from information held by the basic database, in an operation example.
Figure 11A:
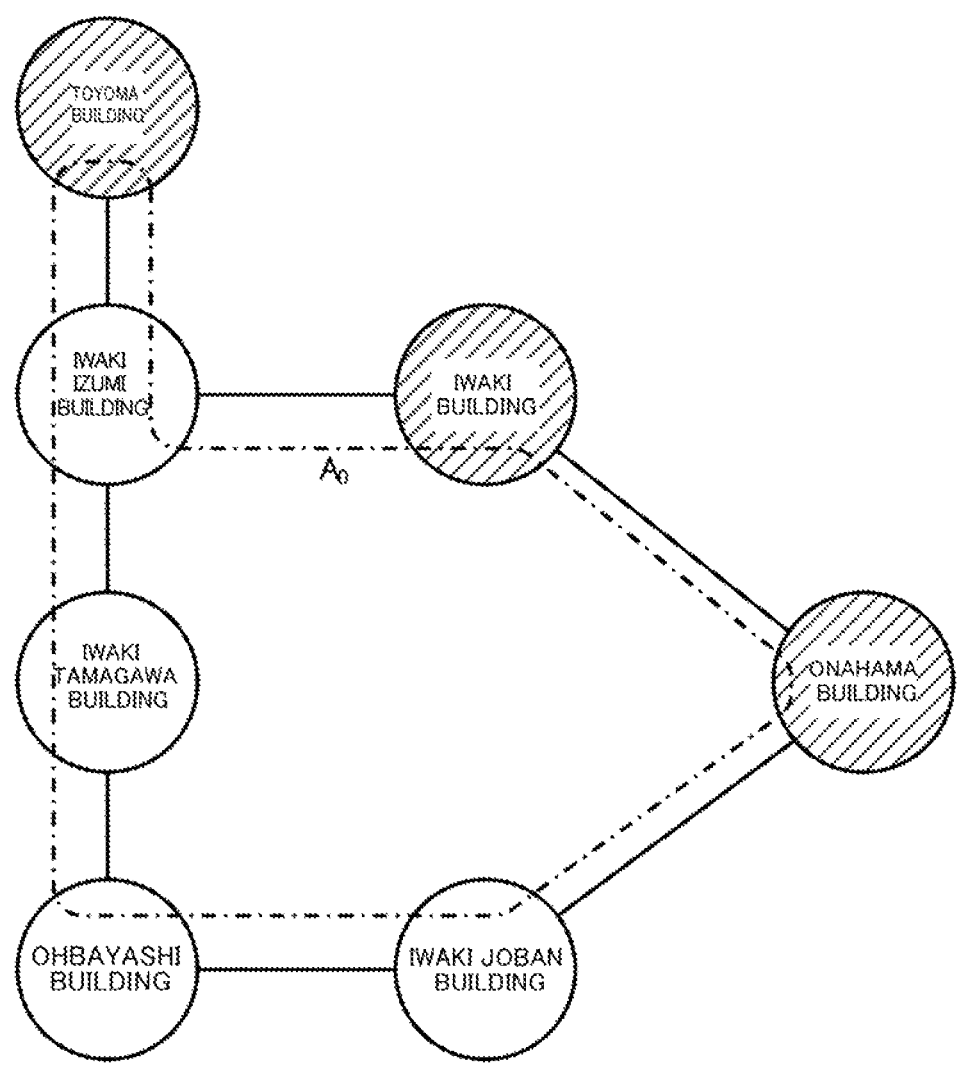
FIG. 11A is a schematic diagram illustrating an example of a closed path generated by a path creation unit in an operation example.
Figure 11B:
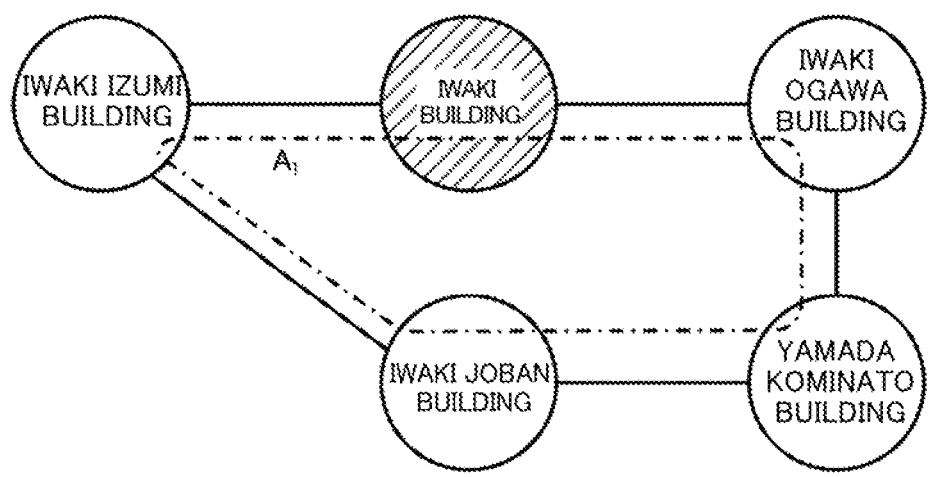
FIG. 11B is a schematic diagram illustrating an example of a closed path generated by the path creation unit in an operation example.
Figure 11C:
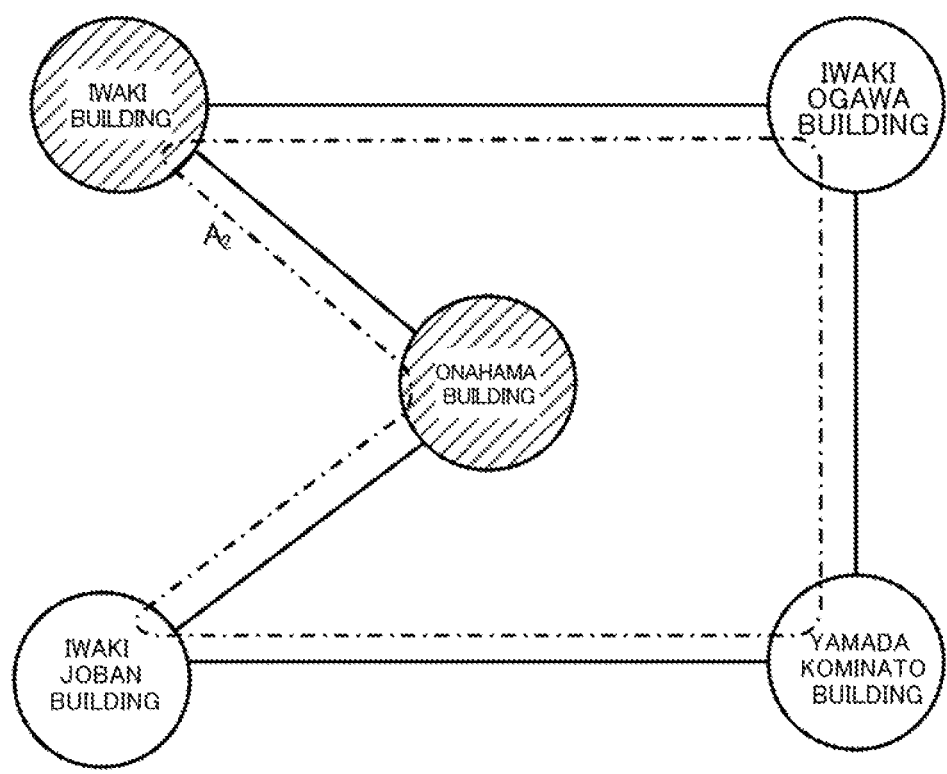
FIG. 11C is a schematic diagram illustrating an example of a closed path generated by the path creation unit in an operation example.
Figure 11D:
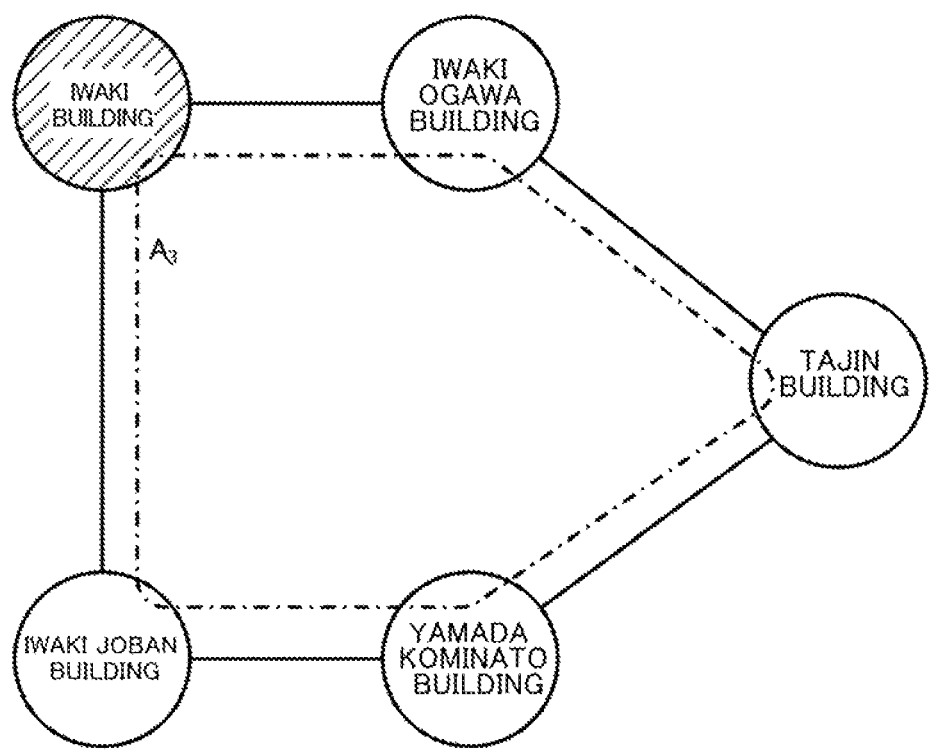
FIG. 11D is a schematic diagram illustrating an example of a closed path generated by the path creation unit in an operation example.
Figure 11E:
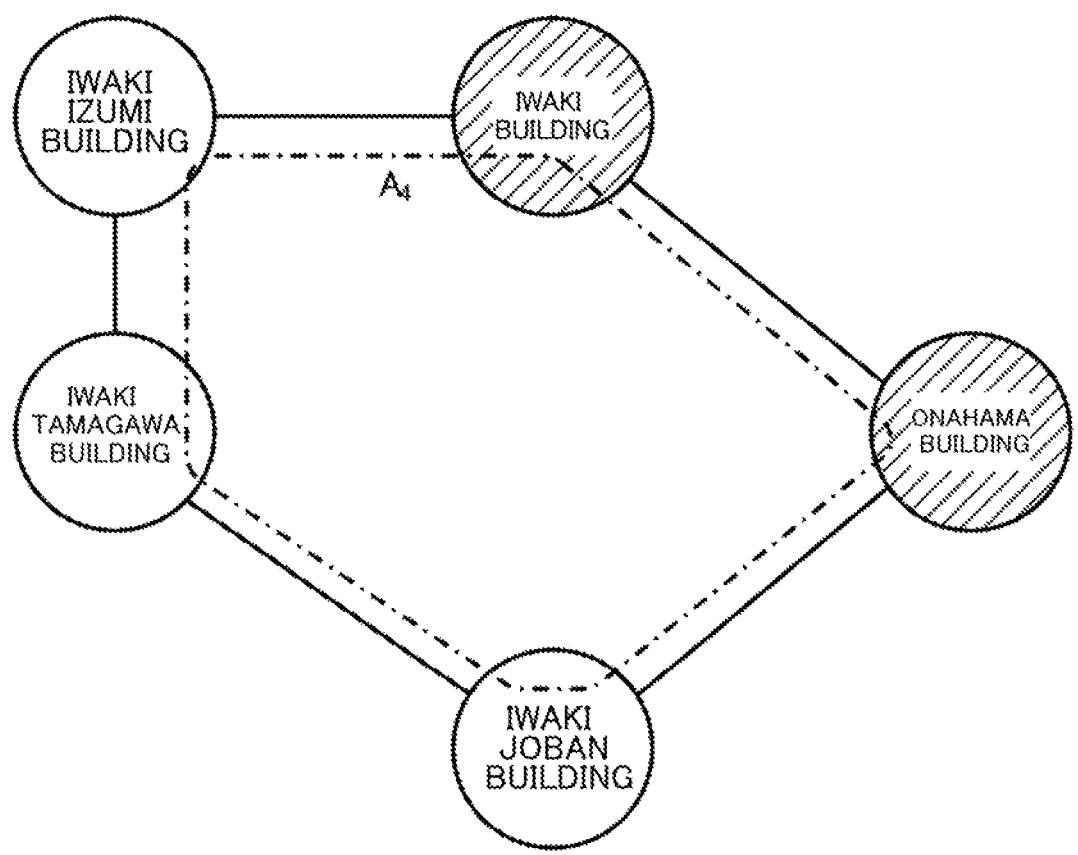
FIG. 11E is a schematic diagram illustrating an example of a closed path generated by the path creation unit in an operation example.
Figure 11F:
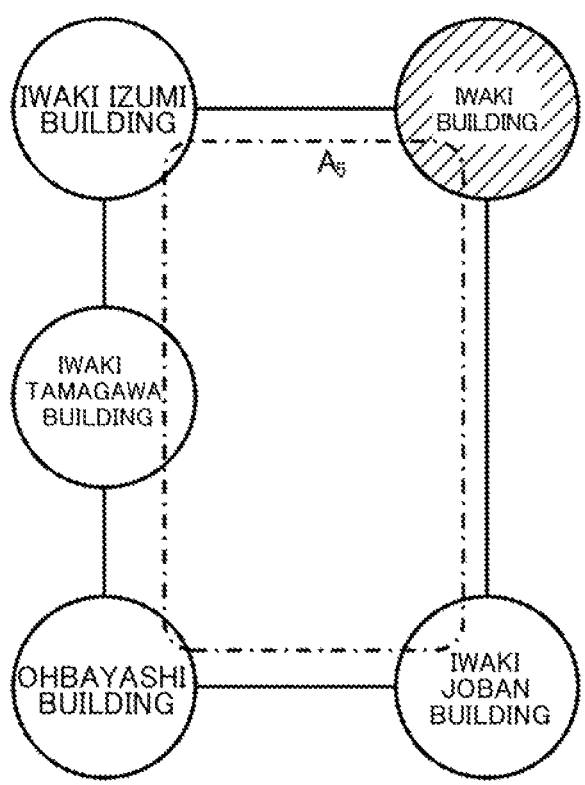
FIG. 11F is a schematic diagram illustrating an example of a closed path generated by the path creation unit in an operation example.

In step S1, operating as the graph creation unit 3, the processor 101 of the name data associating device creates the closed path graph. FIG. 9 is a schematic diagram illustrating an example of the closed path graph created from the information held by the derivative database 2 in the operation example, and FIG. 10 is a schematic diagram illustrating an example of the closed path graph created from the information held by the basic database 1 in the operation example.

Edge sets $E_c$ and $E_d$ obtained from the adjacency information in each database are as follows.

$E_c$={(Iwaki Building, Izumi Building), (Izumi Building, Tamagawa Building), (Tamagawa Building, Daini-Yabuki Building), (Daini-Yabuki Building, Joban Building), (Joban Building, Onahama Building), (Onahama Building, Iwaki Building), (Izumi Building, Toyoma Building), (Iwaki Building, Ogawa Building), (Ogawa Building, Tajin Building), (Tajin Building, Kominato Building), (Kominato Building, Joban Building), (Joban Building, Iwaki Building)}

$E_d$={(Iwaki Building, Iwaki Joban Building), (Iwaki Building, Onahama Building), (Iwaki Building, Iwaki Izumi Building), (Iwaki Building, Iwaki Ogawa Building), (Iwaki Joban Building, Iwaki Izumi Building), (Iwaki Joban Building, Iwaki Tamagawa Building), (Iwaki Joban Building, Yamada Kominato Building), (Iwaki Joban Building, Onahama Building), (Iwaki Tamagawa Building, Iwaki Izumi Building), (Iwaki Joban Building, Ohbayashi Building), (Ohbayashi Building, Iwaki Tamagawa Building), (Tajin Building, Yamada Kominato Building), (Yamada Kominato Building, Iwaki Ogawa Building), (Tajin Building, Iwaki Ogawa Building), (Toyoma Building, Iwaki Izumi Building)}

Additionally, in step S2, operating as the common data extraction unit 4, the processor 101 extracts the name data. Here, the name data having the same notation, i.e., the set S of building names, is as follows. In FIG. 9 and FIG. 10, these common building names are indicated by hatching.

S={Iwaki Building, Onahama Building, Toyoma Building}

Accordingly, in step S3, operating as the path information extraction unit 5, the processor 101 generates a closed path in the closed path graph created from the derivative database 2, taking one vertex common between the database 2 and the basic database 1, e.g., $s_1=s_2$=Iwaki Building, as the starting point, and extracts the closed path information. In this case, a closed path $\Gamma_1$ having nine vertices and a closed path $\Gamma_2$ having six vertices are obtained, as indicated below.

$\Gamma_1$=(Iwaki Building, Izumi Building, Toyoma Building, Izumi Building, Tamagawa Building, Daini-Yabuki Building, Joban Building, Onahama Building, Iwaki Building)

$\Gamma2$=(Iwaki Building, Ogawa Building, Tajin Building, Kominato Building, Joban Building, Iwaki Building)

Next, in step S4, operating as the path creation unit 6, the processor 101 generates the closed path A such that the starting point in the closed path graph created from the basic database 1 is "Iwaki Building". However, it is necessary for the following conditions to be satisfied.

Condition 1: |A|=9 or 6

Condition 2: If |A|=9, then

A[3]=Toyoma Building

A[8]=Onahama Building

As a closed path satisfying the above conditions 1 and 2, when the closed path length is 9, the following is generated:

$A_0$=(Iwaki Building, Iwaki Izumi Building, Toyoma Building, Iwaki Izumi Building, Iwaki Tamagawa Building, Ohbayashi Building, Iwaki Joban Building, Onahama Building, Iwaki Building))

and when the closed path length is 6, the following are generated, such that a total of six closed paths are generated:

$A_1$=(Iwaki Building, Iwaki Izumi Building, Iwaki Joban Building, Yamada Kominato Building, Iwaki Ogawa Building, Iwaki Building)

$A_2$=(Iwaki Building, Onahama Building, Iwaki Joban Building, Yamada Kominato Building, Iwaki Ogawa Building, Iwaki Building)

$A_3$=(Iwaki Building, Iwaki Joban Building, Yamada Kominato Building, Tajin Building, Iwaki Ogawa Building, Iwaki Building)

$A_4$=(Iwaki Building, Onahama Building, Iwaki Joban Building, Iwaki Tamagawa Building, Iwaki Izumi Building, Iwaki Building)

$A_5$=(Iwaki Building, Iwaki Joban Building, Ohbayashi Building, Iwaki Tamagawa Building, Iwaki Izumi Building, Iwaki Building)

FIG. 11A to FIG. 11F are schematic diagrams illustrating these closed paths $A_0$ to $A_5$.

Next, in step S5, operating as the associating unit 7, the processor 101 extracts the optimal combination. In other words, the number of closed paths to be calculated this time is 2, while the number of closed paths obtained in step S4 is 6. Therefore, from among the six closed paths, the combination having a higher number of vertices that are passed through and fewer overlapping parts is extracted.

First, in step S502, the processor 101 selects any two closed paths, e.g., closed path $A_0$ and closed path $A_1$, from among the six closed paths.

cycle set={$A_0,A_1$}

Then, from the above definition, the processor 101 obtains the following in step S503 to step S505:

$\alpha_0:=A_0$, $\alpha_1:=A_1$ union=$|\alpha_0\cup\alpha_1|$=|{Iwaki Building, Iwaki Izumi Building, Toyoma Building, Iwaki Tamagawa Building, Ohbayashi Building, Iwaki Joban Building, Onahama Building, Yamada Kominato Building, Iwaki Ogawa Building}|=9 shared vertex={Iwaki Izumi Building, Iwaki Joban Building}

Here, the number of elements of shared vertex is 2, and thus in step S507, processor 101 takes the following:
a_point=Iwaki Izumi Building
z_point=Iwaki Joban Building Four paths are created for these two points, as follows:
$p_{11}:=\alpha_1[x_4:x_7]$=(Iwaki Izumi Building, Iwaki Tamagawa Building, Ohbayashi Building, Iwaki Joban Building)
$p_{12}:=\alpha_1[x_7:x_4]$=(Iwaki Joban Building, Onahama Building, Iwaki Building, Iwaki Izumi Building)
$p_{21}:=\alpha_2[x_2:x_3]$=(Iwaki Izumi Building, Iwaki Joban Building)
$p_{22}:=\alpha_2[x_3:x_2]$=(Iwaki Joban Building, Yamada Kominato Building, Iwaki Ogawa Building, Iwaki Building, Iwaki Izumi Building)

Then, in step S508, the processor 101 can define insert_x and insert_y as a combination of paths that include all the shared vertexes, for the above four paths.
insert_x=12
insert_y=21
A new closed path insert cycle that joins the two paths is created as follows.
insert cycle=(Iwaki Joban Building, Onahama Building, Iwaki Building, Iwaki Izumi Building, Iwaki Joban Building)

Then, in step S511, the processor 101 can obtain the following from the created closed path insert cycle:
insert=4
and can find the following in step S512:
score=5

The processor 101 performs the same operations for the other closed paths $A_j$ ($j \in \{2,3,4,5\}$).

As a result, with cycle set=$\{A_0,A_2\}$, the following are obtained.
union=|{Iwaki Building, Iwaki Izumi Building, Toyoma Building, Iwaki Tamagawa Building, Ohbayashi Building, Iwaki Joban Building, Onahama Building, Yamada Kominato Building, Iwaki Ogawa Building}|=9
insert cycle=(Iwaki Building, Onahama Building, Iwaki Joban Building, Yamada Kominato Building, Iwaki Ogawa Building, Iwaki Building),
insert=5, score=4

With cycle set=$\{A_0,A_3\}$, the following are obtained.
union=|{Iwaki Building, Iwaki Izumi Building, Toyoma Building, Iwaki Tamagawa Building, Ohbayashi Building, Iwaki Joban Building, Onahama Building, Tajin Building, Yamada Kominato Building, Iwaki Ogawa Building}|=10
insert cycle=(Iwaki Building, Onahama Building, Iwaki Joban Building, Iwaki Building)
insert=3, score=7

With cycle set=$\{A_0,A_4\}$, the following are obtained.
union=|{Iwaki Building, Iwaki Izumi Building, Toyoma Building, Iwaki Tamagawa Building, Ohbayashi Building, Iwaki Joban Building, Onahama Building, Yamada Kominato Building, Iwaki Ogawa Building}|=9
insert cycle=(Iwaki Building, Onahama Building, Iwaki Joban Building, Iwaki Tamagawa Building, Iwaki Izumi Building, Iwaki Building)
insert=5, score=4

With cycle set=$\{A_0,A_5\}$, the following are obtained.
union=|{Iwaki Building, Iwaki Izumi Building, Toyoma Building, Iwaki Tamagawa Building, Ohbayashi Building, Iwaki Joban Building, Onahama Building, Yamada Kominato Building, Iwaki Ogawa Building}|=9
insert cycle=(Iwaki Building, Iwaki Joban Building, Ohbayashi Building, Iwaki Tamagawa Building, Iwaki Izumi Building, Iwaki Building)
insert=5, score=4

Through this, in step S514, the processor 101 selects $\{A_0,A_3\}$, which is the combination having the highest score.

Then, in step S6, the processor 101 obtains a combination of name data by comparing the closed path combination $\{A_0,A_3\}$ obtained through the process of step S5 with each closed path $\Gamma_k$ generated in step S3.

In other words, from
$A_0$=(Iwaki Building, Iwaki Izumi Building, Toyoma Building, Iwaki Izumi Building, Iwaki Tamagawa Building, Ohbayashi Building, Iwaki Joban Building, Onahama Building, Iwaki Building)
$\Gamma_1$=(Iwaki Building, Izumi Building, Toyoma Building, Izumi Building, Tamagawa Building, Daini-Yabuki Building, Joban Building, Onahama Building, Iwaki Building) the processor 101 obtains
{(Iwaki Izumi Building, Izumi Building), (Iwaki Tamagawa Building, Tamagawa Building), (Ohbayashi Building, Daini-Yabuki Building), (Iwaki Joban Building, Joban Building)}

Additionally, in
$A_3$=(Iwaki Building, Iwaki Joban Building, Yamada Kominato Building, Tajin Building, Iwaki Ogawa Building, Iwaki Building)
$\Gamma_2$=(Iwaki Building, Ogawa Building, Tajin Building, Kominato Building, Joban Building, Iwaki Building) (Iwaki Joban Building, Joban Building) is obtained from the above combination, and thus the processor 101 determines whether a combination of closed path that takes $A_3$ in reverse order, i.e.,
(Iwaki Building, Iwaki Ogawa Building, Tajin Building, Yamada Kominato Building, Iwaki Joban Building, Iwaki Building)
and $\Gamma_2$ is optimal. From this, the processor 101 obtains the following:
{(Iwaki Ogawa Building, Ogawa Building), (Tajin Building, Tajin Building), (Yamada Kominato Building, Kominato Building)}

Figure 12:
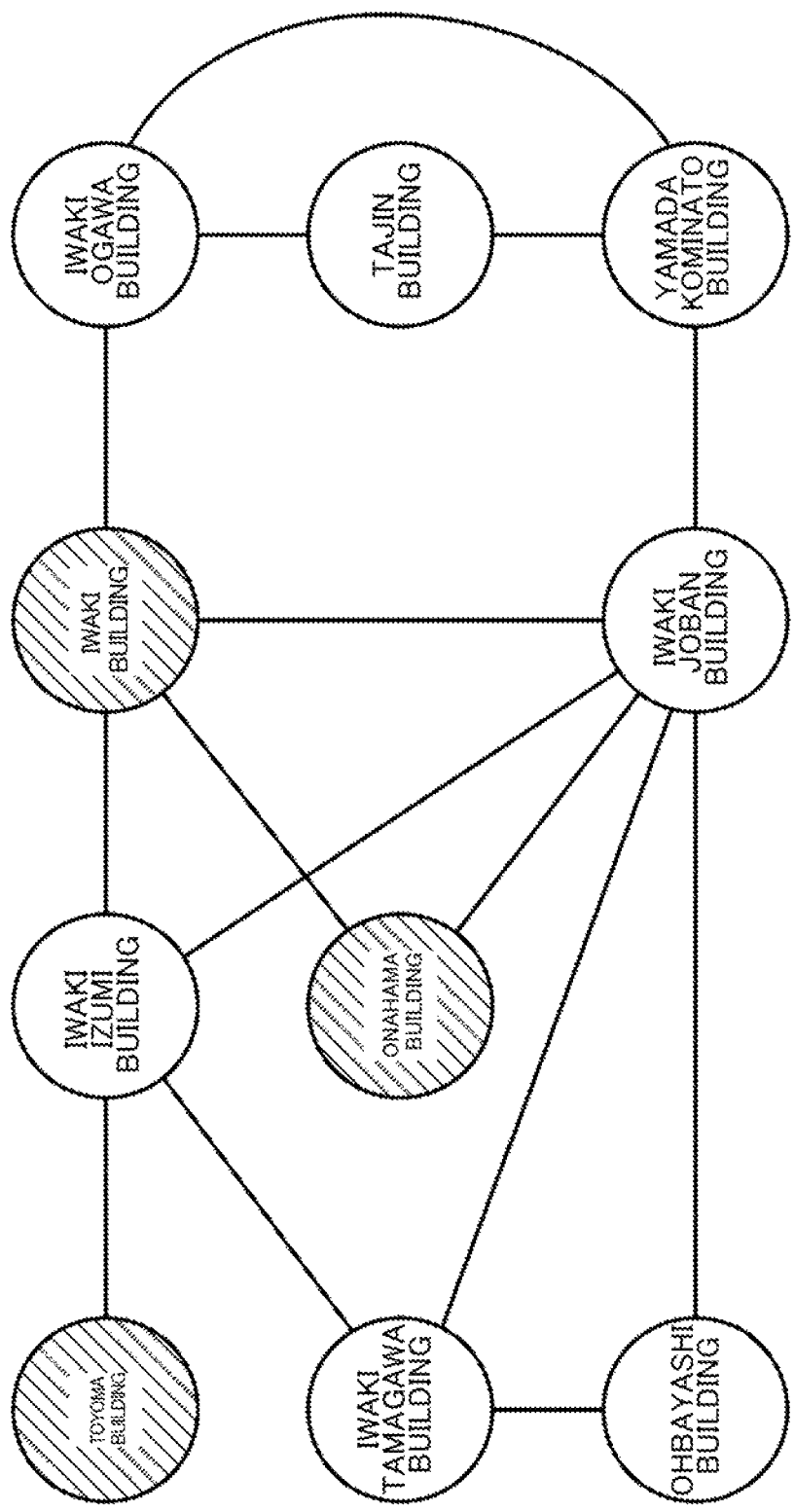
FIG. 12 is a schematic diagram illustrating an example of a closed path graph based on an association result.

FIG. 12 is a schematic diagram illustrating an example of a closed path graph based on this association result. In other words, if the closed path graph in FIG. 10 is rewritten based on the association result, FIG. 12 is obtained, which indicates that an accurate association for all vertices is obtained, as compared to the vertices in the closed path graph in FIG. 9.

Then, the processor 101 generates the output information on the basis of the above association result stored in the temporary storage part 1033 of the data memory 103, and stores the output information in the output information storage part 1034 of the data memory 103. FIG. 13 is a diagram illustrating an example of the output information stored in the output information storage part 1034. Although the output information is indicated here as a correspondence table expressing correspondence relationships between the name data, the output information is of course not limited thereto.

From the foregoing, the ability of the name data associating device to accurately associate name data by using the closed path information was successfully verified.

Comparative Example

As a comparison, association using a known character string search method (PTL 1 or 2) was performed using the data handled in the operation example.

Method Used: Edit Distance (Levenshitein Distance)

Comparative experiment overview: vertex sets $V_c$ and $V_d$ are taken as simple sets of name data, the edit distance of the data in $V_c$ is calculated from each piece of data in $V_d$, and the data having the smallest distance is selected Result: five vertices out of ten vertices were correctly associated (Iwaki Building, Toyoma Building, Onahama Building, Yamada Kominato Building, Tajin Building).

Based on these results, it was difficult to associate character strings that are significantly different from each other, such as "Ohbayashi Building" and "Daini-Yabuki Building," and difficult to show a high degree of similarity for character strings where most of one character string is omitted, such as "Iwaki Izumi Building" and "Izumi Building" ("Iwaki Building" accounts for 14 out of 20 characters for "Iwaki Izumi Building").

OTHER EMBODIMENTS

Although the foregoing embodiment described a closed path in which the starting point and the ending point are the same vertex as an example, a path in which the starting point and the ending point are different vertices may be used. In other words, the name data associating device can draw paths using the name data as vertices using each instance of adjacency information in two target databases, and therefore associates the name data by creating paths, which have the same conditions (same number of vertices and starting point) as the path information obtained from the path of the derivative database 2, on the path of the basic database 1 to which no path identification information has been assigned, and selecting the optimal path among the created paths. This makes it possible to, with no human effort, accurately associate synonymous name data having notation inconsistencies between databases to be integrated, even if character string-specific data corresponding to the name data has no correspondence relationship between the databases. Additionally, in this case, the path can be created easily by creating, on the basis of the information in the databases, an undirected graph that takes the name data as vertices, and using the created undirected graph.

Additionally, although an example in which there are two target databases was described, there may be three or more databases. In other words, as long as at least one of the three or more databases holds path identification information (closed path identification information), the name data can be associated among the remaining two or more databases.

Additionally, the foregoing embodiment described an example in which the processing is performed having stored all or some of the information held by the basic database 1 and the derivative database 2 in the basic database storage part 1031 and the derivative database storage part 1032 of the data memory 103, but the configuration is not limited thereto. The processor 101 may access an external data server as appropriate through the communication interface 104, perform the processing using information stored in the basic database 1 and the derivative database 2 constructed in that data server, and store only the processing results from each step in the temporary storage part 1033. This makes it possible to reduce the size of the data memory 103 included in the name data associating device, which in turn makes it possible to configure the name data associating device at a low cost.

Additionally, although the foregoing embodiment described an example in which the output information is generated and then output to the display unit 108 or an external data processing device, the association result stored in the temporary storage part 1033 may be output, rather than generating the output information. This makes it possible to reduce the size of the data memory 103 included in the name data associating device, which in turn makes it possible to configure the name data associating device at a low cost. This also makes it possible to provide a service that only associates name data in a data processing device that performs database integration processing.

Additionally, the methods described in the embodiments can also be distributed as a program (software means) that can be executed by a computing device (a computer), which is stored in a recording medium such as a magnetic disk (a Floppy (registered trademark) disk, a hard disk, or the like), an optical disk (a CD-ROM, a DVD, an MO, or the like), semiconductor memory (ROM, RAM, Flash memory, or the like), or which is transmitted by a communication medium. The program stored on the media side also includes a configuration program that configures, in the computer, the software means (including not only an executable program but also tables and data structures) to be executed by the computer. The computer that realizes this device reads the program recorded on the recording medium, and in some cases constructs software means by the configuration program, and executes the above-described processing by being controlled by this software means. The recording medium referred to in the present specification is not limited to being for distribution, and includes storage media such as magnetic disks and semiconductor memory installed in computers or devices connected via networks.

In sum, this invention is not limited to the above embodiments, and can be modified in various ways without departing from the scope thereof at the implementation stage. In addition, the embodiments may be combined whenever possible, in which case combined effects can be achieved. Furthermore, the foregoing embodiments include inventions in various stages, and various inventions can be extracted by appropriate combinations of the multiple constituent elements disclosed herein.

REFERENCE SIGNS LIST

1 Basic database
2 Derivative database
3 Graph creation unit
4 Common data extraction unit
5 Path information extraction unit
6 Path creation unit
7 Associating unit
8 Data output unit
101 Processor
102 Program memory
103 Data memory
104 Communication interface
105 Input/output interface
106 Bus
107 Input unit
108 Display unit
1031 Basic database storage part
1032 Derivative database storage part
1033 Temporary storage part
1034 Output information storage part

The invention claimed is:

1. A name data associating device that associates name data that is synonymous and has different notation between a first database and a second database, the first database holding a plurality of pieces of name data and adjacency information indicating adjacency relationships among the name data, and the second database holding a plurality of pieces of name data, adjacency information of the name data, and path identification information indicating paths to which the name data belong, the device comprising:
  a processor; and
  a storage medium having computer program instructions stored thereon, when executed by the processor, perform to:
  extracts, as common data, name data having a same notation between the first database and the second database;
  based on information held by the second database, generates all of paths having one piece of the common data as a starting point and the name data held by the second database as vertices, and for each of the paths, extracts path information including a number of vertices, the common data included, and a location of the common data;
  on the basis of information held in the first database, generates all paths that match name data of the starting point, the number of vertices, the common data included, and the location included in the path information of each path; and
  associates the name data held by the first database with the name data held by the second database by extracting, from the paths having one piece of the common data as a starting point, a combination of paths having a higher number of vertices that are passed through and fewer overlapping parts, and associating the vertices of each extracted path with the vertices of each path.

2. The name data associating device according to claim 1, wherein the computer program instructions further perform to, on the basis of the information held in the first and second databases, creates an undirected graph that takes the name data as vertices,
  wherein on the basis of the undirected graph and the path identification information held by the second database, generates all paths that have one of the common data as the starting point and the name data held by the second database as vertices, and extracts the path information for each of the paths, and
  on the basis of the undirected graph, generates all paths matching the name data of the starting point, the number of vertices, the common data included, and the location included in the path information of each of the paths.

3. The name data associating device according to claim 2, wherein the computer program instructions further perform to
  on the basis of the adjacency information held by the first and second databases, creates, as the undirected graph, a closed path graph having the name data as vertices,
  on the basis of closed path identification information that is the closed path graph and the path identification information held by the second database, generates, as the paths, all closed paths having one of the common data as both the starting point and an ending point and the name data held by the second database as vertices, and extracts, as the path information, closed path information including the number of vertices, the common data included, and the location for each of all the closed paths generated,
  on the basis of the closed path graph created by the closed path graph creation unit, generates, as the paths, all closed paths matching the name data of the starting point and the ending point, the number of vertices, the common data included, and the location included in the closed path information of each of the closed paths, and
  associates the name data held by the first database with the name data held by the second database by extracting, from the closed paths, a combination of closed paths having a higher number of vertices that are passed through and fewer overlapping parts, and associating vertices in each of the closed paths extracted with vertices in each of the closed paths.

4. The name data associating device according to claim 3, wherein when a closed path is generated, the computer program instructions further perform to associate the name data held by the first database with the name data held by the second database by associating vertices of the closed path with vertices of each of the closed paths.

5. The name data associating device according to claim 3, wherein the computer program instructions further perform to, when a plurality of closed paths are generated, selects, from among the plurality of closed paths, a combination of closed paths for each number of closed paths, and by determining a number of vertices passed through and overlapping parts for each of the combinations of closed paths, extracts a combination of the closed paths having a higher number of vertices that are passed through and fewer overlapping parts.

6. The name data associating device according to claim 1, further comprising:
  an output unit that, on the basis of a result of the associating, generates output information including a correspondence table of the name data.

7. A non-transitory computer-readable medium having computer-executable instructions that, upon execution of the instructions by a processor of a computer, cause the computer to function as the name data associating device according to claim 1.

8. A name data associating method performed by a name data associating device, the device including a processor and memory, the memory storing a first database holding a plurality of pieces of name data and adjacency information indicating adjacency relationships among the name data and a second database holding a plurality of pieces of name data, adjacency information of the name data, and path identification information indicating paths to which the name data belong, and the device associating name data that is synonymous and has different notation between the first database and the second database, the method comprising:
  the processor extracting, as common data, name data having a same notation between the first database and the second database stored in the memory;
  the processor generating, on the basis of information held by the second database, all of paths having one piece of the extracted common data as a starting point and the name data held by the second database as vertices;
  the processor extracting a number of vertices, included common data, and a location of the common data for each of the paths generated on the basis of the information held by the second database;
  the processor generating, on the basis of information held in the first database, all paths that match name data of the starting point, the number of vertices, the common data included, and the location included in the path information of each path extracted by the path information extraction unit;
  the processor extracting, from the paths generated on the basis of the information held by the first database, a combination of paths having a higher number of vertices that are passed through and fewer overlapping parts; and the processor associating the name data held by the first database with the name data held by the second database by associating the vertices of each path in the extracted combination of paths with the vertices of each path generated on the basis of the information held by the second database.

9. The name data associating method of claim 8 further comprises on the basis of the information held in the first and second databases, creating an undirected graph that takes the name data as vertices, on the basis of the undirected graph and the path identification information held by the second database, generating all paths that have one of the common data as the starting point and the name data held by the second database as vertices, and extracting the path information for each of the paths, and on the basis of the undirected graph, generating all paths matching the name data of the starting point, the number of vertices, the common data included, and the location included in the path information of each of the paths.

10. The name data associating method of claim 8 further comprises on the basis of the adjacency information held by the first and second databases, creating, as the undirected graph, a closed path graph having the name data as vertices, on the basis of closed path identification information that is the closed path graph and the path identification information held by the second database, generating, as the paths, all closed paths having one of the common data as both the starting point and an ending point and the name data held by the second database as vertices, and extracts, as the path information, closed path information including the number of vertices, the common data included, and the location for each of all the closed paths generated, on the basis of the closed path graph, generating, as the paths, all closed paths matching the name data of the starting point and the ending point, the number of vertices, the common data included, and the location included in the closed path information of each of the closed paths, and associating the name data held by the first database with the name data held by the second database by extracting, from the closed paths, a combination of closed paths having a higher number of vertices that are passed through and fewer overlapping parts, and associating vertices in each of the closed paths extracted with vertices in each of the closed paths.

11. The name data associating method of claim 8 further comprises when a closed path is generated, associating the name data held by the first database with the name data held by the second database by associating vertices of the closed path with vertices of each of the closed paths extracted by the closed path information extraction unit.

12. The name data associating method of claim 8 further comprises, when a plurality of closed paths are generated, selecting, from among the plurality of closed paths, a combination of closed paths for each number of closed paths, and by determining a number of vertices passed through and overlapping parts for each of the combinations of closed paths, extracting a combination of the closed paths having a higher number of vertices that are passed through and fewer overlapping parts.

* * * * *